US005315324A

United States Patent [19]

Kubelik et al.

[11] Patent Number: 5,315,324

[45] Date of Patent: May 24, 1994

[54] HIGH PRECISION CHARGE IMAGING CARTRIDGE

[75] Inventors: Igor Kubelik, Mississauga; Michael Simmonds, Caledon East, both of Canada

[73] Assignee: Delphax Systems, Canton, Mass.

[21] Appl. No.: 987,623

[22] Filed: Dec. 9, 1992

[51] Int. Cl.[5] ..... G01D 15/06

[52] U.S. Cl. ..... 346/159; 29/860; 29/863; 346/155

[58] Field of Search ..... 346/153.1, 154, 155, 346/159, 160.1; 29/857, 860, 861, 863, 884; 174/52.1, 52.3, 52.4

[56] References Cited

U.S. PATENT DOCUMENTS

| | | | |
|---|---|---|---|
| 3,611,419 | 10/1971 | Blumenthal | 346/155 |
| 3,903,594 | 9/1975 | Koneval | 346/155 X |
| 4,287,525 | 9/1981 | Tagawa | 346/155 |
| 4,679,060 | 7/1987 | McCallum et al. | 346/159 |
| 4,809,135 | 2/1989 | Yerman | 174/52.4 X |
| 4,872,260 | 10/1989 | Johnson et al. | 174/52.4 X |
| 4,890,123 | 12/1989 | McCallum et al. | 346/159 |
| 4,891,656 | 1/1990 | Kubelik | 346/155 |
| 4,942,428 | 7/1990 | Rakov et al. | 346/159 X |
| 5,030,975 | 7/1991 | McCallum et al. | 346/155 |
| 5,150,134 | 9/1992 | Hansen et al. | 346/155 |

*Primary Examiner*—A. T. Grimley
*Assistant Examiner*—Robert Beatty
*Attorney, Agent, or Firm*—Lahive & Cockfield

[57] ABSTRACT

A print cartridge contains a matrix array of electrodes which are energized to deposit a latent charge image. To make the cartridge, electrodes are fabricated on a sheet which is then deformed about a rigid spine. Certain electrodes are formed of plural segments, and the segments are electrically interconnected only after the sheet is deformed. This prevents strains introduced during manufacture from building up over large distances and pulling active electrode structures out of alignment. A preferred cartridge has an area of active electrodes, which is planar and undeformed. Lead-in electrodes extend through deformed regions of the sheet, and are conductively fastened to the active electrodes only after the sheet has been deformed about a rigid spine and the electrodes have attained a stable and unstressed position. The spine maintains the active electrodes in a precise plane, and accommodates pressure from spring-loaded electrical contacts without deflecting.

9 Claims, 7 Drawing Sheets

HIGH PRECISION CHARGE IMAGING CARTRIDGE

BACKGROUND

The present invention relates to charge transfer imaging of the type wherein a latent charge image is deposited on a receiving member, and in particular relates to a cartridge for creating the latent charge image. Such cartridges are characterized by having sets of mutually crossing electrodes, that together define a matrix array of charge-generating loci. By way of example, such charge generators may be used to selectively change the state of a planar liquid crystal or other display, or to "write" the latent charge image on a moving dielectric surface, such as a belt or drum, for toning and printing an electrographic image. In this latter area electric charge transfer print cartridges, to compete effectively with other technologies, must exhibit an image resolution of hundreds of dots per inch, or more. This has necessitated the fabrication of electrode arrays having small dimension and very dense packing of elements. For example, a cartridge spanning an 8½ inch office-size sheet may have over one hundred parallel "finger" electrodes, each having 8, 12 or 16 apertures that define charge transfer loci, within an overall vertical band of about one centimeter width.

The existing print cartridges of this type are versatile, in the sense that the charge generation sites are individually addressable, and their individual outputs may be controlled in magnitude, so that images may be selectively printed or their shading characteristics manipulated or improved by control and image-processing software. Nonetheless, they rely on projecting charged particles across a gap to the receiving member, and the quantity of charge received at the member thus critically depends on maintaining a proper gap and uniform alignment over the active area of the cartridge.

Since the introduction of the earliest cartridges of this type, as exemplified, for example, in U.S. Pat. Nos. 4,155,093 to Fotland and Carrish and 4,160,257 to Carrish, these cartridges have been fabricated with a rigidifying member to provide the necessary stiffness and dimensional stability.

In a typical construction the cartridge is located adjacent a dielectric surface of a drum, oriented parallel to the drum axis, at a spacing of 0.2 to 0.5 mm. from the surface. When a belt is used rather than an imaging drum, the belt typically passes over a drum or over a flat platen, which holds it in a precise physical location opposed to the cartridge and which generally also defines a conductive backplane that establishes an accelerating potential to move the charge carriers from the cartridge to the imaging member.

These cartridges operate by controlled generation of localized plasma discharges, and in use are subject to heating up; they must also be mounted so that their many electrical contacts are dependably maintained without introducing mechanical stresses that might deform the cartridge along its span. If dimensional changes in the cartridge to imaging member gap do occur, they can result in flashover or arcing when the gap decreases, or loss of intensity or resolution when the gap increases.

One example of cartridge construction is described in commonly owned U.S. Pat. No. 4,679,060 to McCallum et al. This cartridge includes a number of relatively thin planar structural layers and produces a charge transfer image by means of a charge generator in the form of a matrix of electrodes located on an inner surface of the cartridge. Outer surfaces of the cartridge facing away from the drum are provided with contacts for electrical connection of individual electrodes with corresponding spring biased contacts linked to a cartridge control board, also known as a mother board, for controlling image generation. An exemplary configuration of a drum-type printer for receiving such a cartridge is described in U.S. Pat. No. 4,516,847 to Maczuszenko et al. That cartridge also includes an aluminum spine which rigidifies the cartridge and extends outwardly to provide a handle to be used when the cartridge is being fitted or removed from the printer.

That cartridge is mounted in a printer on mounting blocks which are adjusted relative to rigid parts of the printer structure using shims to give the desired spacing between the cartridge and the drum surface (typically 0.01 inches). Understandably, it would be difficult to adjust the spacing each time a cartridge was replaced. Accordingly, the mounting blocks are set-up during assembly of the printer and are not normally adjusted during the life of the printer, so that replacement cartridges must be accurately located on the mounting blocks. To achieve this accurate location, the lower contact surface of each cartridge must be accurately sized and is, therefore, formed of a substantial piece of high grade material, typically high grade fibre glass reinforced epoxy, which adds considerably to the cost of the cartridge. Also, particles of dust or the like may find their way between the contact surfaces of the cartridge and mounting and thus affect the spacing.

Connections between the contacts on the outer face of the cartridge and the mother board are made by spring pin contacts which extend downwardly from the mother board. These contacts are relatively expensive and the total cost of the hundreds of contacts required for a cartridge adds significantly to the total cost of the printer. Also, the spring forces exerted on the cartridge contacts by the spring contacts further complicate the accurate location of the cartridge because the accumulation of small forces tends to push the cartridge towards the drum, and could affect the spacing between the cartridge and drum.

Other forms of cartridges are available which provide cartridge contacts on the inner face of the cartridge and do not require such expensive spring pin contacts. However, the mother board contacts for such cartridges must be located in the restricted space between the cartridge and the drum, the space becoming more restricted as larger diameter print drums are utilized. These cartridges also suffer from the disadvantage that the spring forces from the mother board contacts tend to push the cartridge away from the drum, and again could affect the spacing between the cartridge and the drum.

These disadvantages have lead to the design of a different configuration of cartridge and cartridge mounting, as described, for example, in commonly-owned U.S. patent entitled Charge Transfer Imaging Cartridge Mounting and Printer, U.S. Pat. No. 4,951,070. In one such mounting, the cartridge includes a rectangular cross section spine, the inner portion of the cartridge being located on a face of the spine and the cartridge contacts being located on side faces of the spine. The cartridge is located in a channel defined by two spaced elements, from which spring biased mother board contacts extend to bear against the cartridge contacts. As the spring forces from the mother board contacts are acting on the cartridge parallel to the inner face and the drum surface, the forces do not tend to affect the spacing between the cartridge and the drum.

In order to preserve the benefits of planar fabrication of these devices, and yet not exert forces perpendicular to the electrode plane for contacting the various electrodes, a further cartridge exemplified in U.S. Pat. No. 5,030,975 was developed. That cartridge was formed by a planar electrode matrix fabricated on a flexible dielectric substrate. With this arrangement, the completed electrode matrix could be bent around a rigid box spine, and its electrodes easily accessed and contacted on the sides or back of the spine.

This latter construction has achieved a very dense dot array with a high degree of surface flatness in a cartridge that is not prone to warpage in use.

However, while the array remains flat, the processing and wrapping of the flexible array about the rigid spine has now been found to introduce stresses into the structure that could affect alignment of the electrodes defining individual dot sites. The effect of such stresses introduced during manufacturing is an irregular shifting of the electrode layers of the device such that the active electrodes or corona recesses become misaligned, leading to loss of output.

SUMMARY OF THE INVENTION

Accordingly, it is an object of the invention to provide a charge transfer cartridge having improved electrode alignment while achieving the surface flatness of a flexible sheet construction.

It is another object of the invention to provide a cartridge, a method of manufacturing a cartridge, and a printer utilizing a cartridge, wherein electrodes are laid down in segments on a sheet, each segment being subject to only limited stress during assembly, and the segments are conductively interconnected after deformation of the sheet to a final shape.

These and other features are attained in accordance with the present invention by forming segmented electrode sets on a flexible sheet, deforming the sheet onto a rigid spine, and joining at least some of the electrode segments after deformation of the sheet, such that each segment has attained a stable position and stress of deformation is not transmitted from one segment to another in the joined electrode. By forming active charge emitting electrodes in a central segment subject to symmetric stress or no bending deformation, shifting of critical active electrodes is effectively eliminated. Additional lead-in segments may extend through regions of deformation or over long lengths, without impairing the ultimate alignment of the critical electrodes.

In a preferred embodiment, a flexible sheet bears a first set of electrodes that extend substantially the length of the spine, and a second set that extend across a narrow dimension of the spine. The second set includes control segments bearing the active charge locating structure, effectively a set of electrode apertures or edges that define localized discharge regions or beam openings, and also includes first and second side segments that extend in opposite directions. After deformation of the flexible sheet, the first and second segments, respectively, are joined to alternate central segments.

BRIEF DESCRIPTION OF THE DRAWINGS

These and other features will be understood by reference to the drawings herein, where.

DETAILED DESCRIPTION

Figure 1:
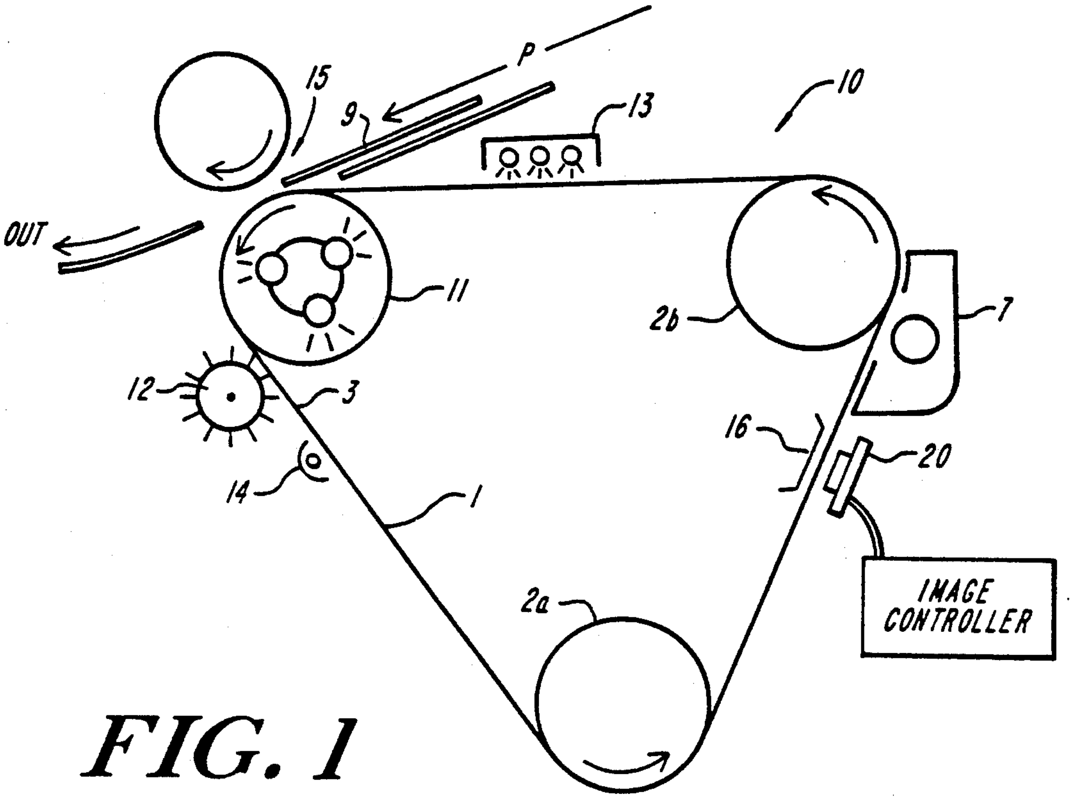
FIG. 1 is a general schematic view of a web-type printer employing charge transfer imaging cartridge.
Figure 4:
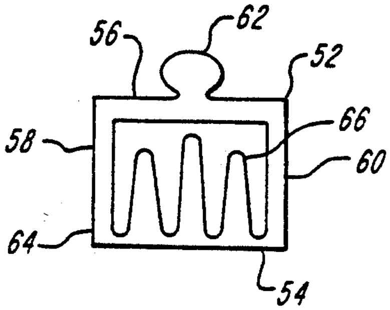
FIG. 4 (PRIOR ART)
FIG. 2–5 are views of a cartridge according to the prior art.
Figure 2:
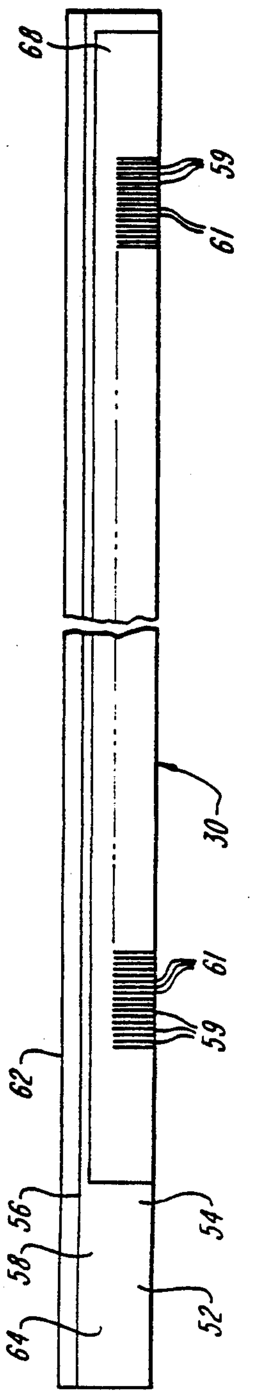
FIG. 2 (PRIOR ART)
Figure 3:
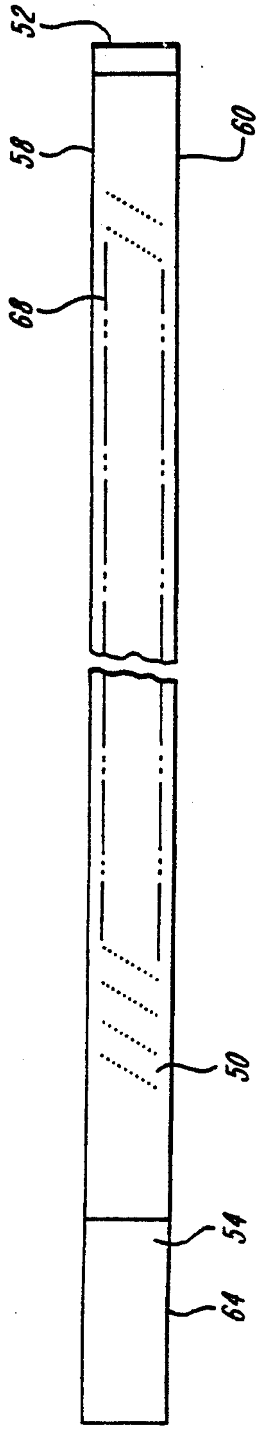
FIG. 3 (PRIOR ART)

The context of the present invention will be understood by reference to FIG. 1, which shows the elements of a charge transfer printing system 10 using a dielectric web 1 as a latent imaging member.

The illustrated system 10 employs a web or belt 1 having a heat release property, as disclosed in commonly owned U.S. Pat. No. 5,103,263, and is somewhat unusual in that the belt is heated by heaters 13 and heated roller 11 to liquify the toned image before it is transferred to a sheet 9 at transfer nip 15. However, it will be understood that the present invention relates solely to the print cartridge of the device, and is therefore equally applicable to printers wherein a drum receives the deposited charge image, and the transfer and fusing of the image are effected at one or more other locations, possibly by means of an intermediate transfer belt, so that the only essential belt characteristic is its dielectric property for receiving and holding a deposited charge.

Illustrated system 10 employs a print cartridge 20 to deposit a pointwise controlled image on belt 1, which runs over a back plate or platen 16 that positions the belt surface in a precise location spaced from the cartridge 20. After charging with an electric latent image, the belt runs by a toning roll assembly 7 to tone the electrostatic image, and the toned image is then preheated by heater 13 before passing through transfer nip 15 where it is pressed by hot roll against a receiving sheet 9 traveling along sheet feed path P 11. After transfer of the image, a cleaner brush 12 located along a return portion 3 of the belt travel removes any residual toner, and a corona erase rod 14 brings the belt back to a discharged or uniformly charged state. The illustrated system employs a relatively long belt, which runs over unheated rollers *2a*, *2b* in the charging and powder toning regions, and runs over heated roller 11 at the transfer/fusing nip. Positive cooling, for example by circulation of fluid through roller *2a*, may be provided to assure that the belt is sufficiently cool when passing through the toning roll assembly 7.

Belt 1 is at least as wide as the intended print sheet, and print cartridge 20 extends the width of the belt, in a plane perpendicular to the drawing sheet.

Reference will now be made to FIGS. 2 to 5, which show various views of a prior art cartridge 30. The main structural member of the cartridge 30 is a hollow and generally rectangular elongate aluminum spine 52, having respective inner, outer and side walls 54, 56, 58, 60. The outer wall 56 is provided with a longitudinally extending locating rib 62 for engagement with the cartridge mounting in the frame of a printer, and one end of the spine forms a handle 64 by which the spine may be gripped to be withdrawn from the mounting. The interior of the spine 52 features a number of fins, one of which is designated 66, which extend outwardly from the inner wall 54 parallel to the side walls 58, 60. In cartridges for use in high speed printers the fins dissipate heat from the inner wall to cooling air which is passed through the spine 52. In cartridges used in low speed printers, the fins may facilitate heating of the inner wall from heating air that is passed through the spine, or alternatively, the fins may be dispensed with and a heating element located in the spine.

A flexible substrate 68 is affixed to the inner and side walls 54, 58, and 60 of the spine 52. The substrate serves as a mounting for the various components of the cartridge 30 which will be described briefly mainly with reference to FIG. 5.

Figure 5:
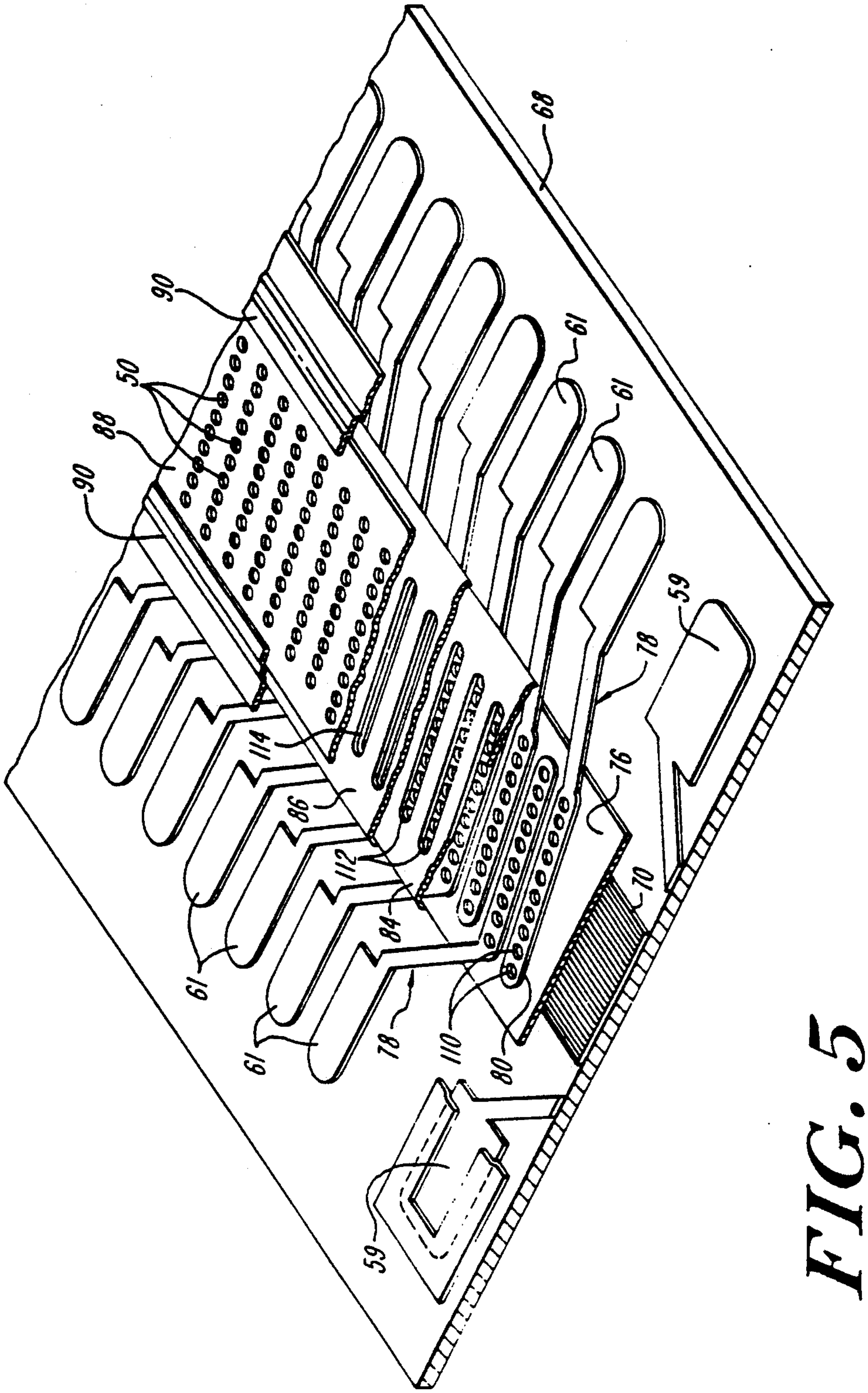
FIG. 5 (PRIOR ART)

As shown in FIG. 5, the cartridge is manufactured flat, and is wrapped around the spine. As a result the inner face 54 carries apertures 50 in rows and charge carriers are directed at the imaging member through these apertures. Contacts for supplying electrical drive signals to cause the discharges between electrodes, which are in alignment with the apertures, are provided on side faces 58, 60. End contacts 59 are connected to driver electrodes 70 which extend longitudinally of the spine, and contacts 61 connect to finger electrodes 78 which extend transversely over the driver electrodes as will be explained.

FIG. 5 shows a prior art cartridge with portions broken away to reveal components mounted on the substrate 68 during manufacture and before the substrate is flexed and affixed to the spine 52. The innermost components carried by the flexible substrate 68, are the first or driver electrodes 70. These electrodes are a plurality of parallel conductors which extend longitudinally along the substrate 68, and are coupled to the individual contacts 59 extending generally transversely from one end of each of the parallel conductors 70.

As noted above, the need to maintain precise flatness has led to the development of cartridge electrode structures on a flexible substrate, that can be wrapped around a precision spine. The overall construction technique involved in manufacture of such devices, of which the present invention is an improvement, will be understood from a description of the fabrication steps for the exemplary prior art cartridge of FIG. 5.

Continuing with the description of FIG. 5, a dielectric layer 76 is located over the parallel conductors 70, and second or finger electrodes 78 form the next layer. The finger electrodes 78 comprise first portions 80 for location over the dielectric layer 76, and individual contacts 61 arranged on alternate sides of the first portions 80 next to the sides of the dielectric, although in other cartridge designs, the contacts may all extend only a single side of the dielectric layer 76.

Spacer layers 84 and 86 are located over the finger electrodes 78, with a screen electrode 88 supported by the second or outermost spacer layer 86. The screen electrode 88 and associated spacer layers 84, 86 are optional because the driver and finger electrodes 70, 78 provide the necessary charge imaging matrix. However, print quality is considerably enhanced by use of the third, or screen electrode 88, which is therefore used in the preferred embodiment. An overcoat layer 90 is the final component applied to the substrate, and serves to seal the screen 88 to the substrate 68.

Continuing with a description of the prior art cartridge, the substrate is of a flexible dielectric material such as a thin piece of glass fibre reinforced epoxy, and, in this example, is approximately 400 mm long, 62 mm wide, an 0.1 mm thick. A suitable epoxy for use in formation of the substrate is sold under the designation FR4 by Norplex Oak of Hoosick Falls, N.Y., and is initially provided with a copper coating of about 0.017 mm thickness on both sides.

One of the copper surfaces is first prepared by cleaning with water and copper cleaner and then rinsing with water and drying in an oven. A photo resist, such as that sold under the trade mark Aquamer by Hercules, is applied to the surface and two location holes are punched through the various layers of photo resist, copper, and substrate. The coated substrate 68 is then located and suitable artwork (not shown) is placed over the photoresist layer and the resist is exposed, once the artwork is located and drawn against the substrate by a vacuum. After exposure, the photoresist and copper coating are etched and stripped leaving a portion of the copper coating to form the driver electrodes 70.

The dielectric layer 76 is applied to cover the electrodes 70. The layer 76 may be formed of any suitable dielectric material, typically mica, which is attached, after cleaning, using an ultra-violet curable epoxy. The adhesive is positioned between the mica and the conductors and then the parts are squeezed together to ensure that a uniform coating is provided and also to cause the adhesive to impregnate between the individual driver electrodes.

When mica is used, care should be taken not to bend or flex the portion of the substrate to which the mica is affixed, as this could result in damage to the brittle mica layer.

If processing is such that is not possible to prevent bending or flexing of the substrate, or the dimensions of dielectric required do not permit mica to be used, an alternative dielectric material should be used. An appropriate material would be a silicone modified polymer.

The finger electrodes 78 are formed by twice etching a stainless steel foil. The first etch is carried out when the foil has been cleaned and coated on both sides with a suitable photoresist such as that sold under the trade mark Aquamer, as described above. This etch leaves the fingers connected to each other for ease of handling and alignment during assembly. The etch is effected as follows. The coated foil is placed in an exposure unit between two pieces of similar artwork to form a sandwich, and is exposed from both sides. The foil is then removed from the exposure unit and etched to define the main parts of the electrodes, including holes 110 which provide edge structures to act as charge generation sites as described in U.S. Pat. No. 4,155,093.

Before positioning the finger electrode foil over the substrate 68 on the dielectric 76, a coating of pressure sensitive adhesive is sprayed onto the surface which is then wetted with de-ionized water. A suitable adhesive is that known as Densil and developed by Dennison Manufacturing Company. The adhesive may be formed by mixing a catalyst and solvent with a resin such as that sold under the trade mark SILGRIP by the General Electric Company. The cleaned foil is placed on the substrate and moved from side to side on the wetted adhesive. The foil floats in the water to allow easy positioning of the foil relative to the parallel driver electrodes 70, this positioning operation being carried out beneath a microscope. When the foil is correctly aligned, one corner of the foil is pressed into contact with the dielectric layer 76. The substrate 68 is then placed on a dry surface and water absorbent wipes are pressed on the foil to absorb the de-ionized water so that the foil is brought into contact with the dielectric layer 76 and the substrate 68. The assembly is then dried before being rolled together to ensure proper adhesion of the foil to the substrate.

The resulting sub-assembly is then subject to a second lamination, imaging, and etching operation to separate adjacent fingers. The second etch is not done until this stage as the separation of the fingers at an earlier stage would have weakened the foil and made it more difficult to handle. The artwork for forming the electrodes includes apertures for receiving alignment pins. Note that the driver and finger electrodes extend to a similar width on the substrate.

The next stage of the manufacturing process is the application of first and second spacer layers 84, 86 which are formed by separately laminating the substrate 68 with a dry film solder mask, such as that sold under the trade mark VACREL by DuPont. The respective solder masks for patterning each of these two layers are independently covered with appropriate artwork and exposed.

After the substrate 68 has been laminated with the two exposed layers, which have a combined thickness of approximately 0.006 inches, the solder mask is developed to remove the unexposed solder mask, and the device is rinsed and dried. The first spacer layer 84 covers the first portions 80 of the finger electrodes 78. This portion is provided with a plurality of parallel slots 112 corresponding to the rows of apertures 110 formed in the first portions 80 of the finger electrodes 78. End portions are provided to occupy the spaces between the contacts of the driver electrodes.

The second spacer layer 86 is shaped to cover only the central portion of the first spacer layer 84 and has slots 114 aligned with slots 112.

The screen electrode 88, is formed by laminating, exposing and etching a cleaned stainless steel foil to produce an etched foil. The screen 88 is formed with the aforementioned apertures 50 arranged in parallel lines corresponding to the respective underlying apertures and slots of the finger electrodes and spacer layers.

To assemble the substrate 68 and screen 88, the substrate is placed on a smooth work surface and a bed of pressure sensitive adhesive, such as Densil, is applied to each end of the substrate. The screen 88 is then positioned on the substrate and located accurately by use of a microscope. When the screen has been correctly located it is pushed down to spread the adhesive to form a larger adhesion area.

The edges of the screen 88 are sealed to the substrate by means of the solder mask overcoat layer 90, by locating a screen mask of 4 mm thick stainless steel on the screen 88 over the screen apertures and then laminating the substrate with solder mask. Appropriate artwork is placed over the solder mask, and the screen 88 and screen mask, buried within the solder mask, are exposed. The coversheet is then removed, the solder mask developed, and the screen mask removed to leave an overcoat layer 90 which acts to seal down the edges of the screen 88.

The substrate assembly is now ready for application to the spine 52 (FIG. 3) for which purpose a layer of double sided adhesive tape is applied to the outer face of the substrate. The portion of the substrate carrying the parallel conductors 70 and the first portions 80 of the finger electrodes is then affixed to the inner wall 54 of the spine 52, alignment pins being used to ensure the accurate location of the substrate on the spine. The substrate 68 wrapped around the spine 52 so that the charge generating portion of the cartridge is located on the inner wall 54 and the contacts extend across the side walls 58, 60, orthogonally inclined to the inner wall 54.

Because solder mask becomes brittle on curing, the various solder mask layers just described are cured at this point, after the substrate has been bent around the spine. This is done by slightly heating the aasembly, leaving the Vacrel somewhat undercured. This step completes the assembly process, and the cartridge may be used in a printer as described above.

In the prior art cartridge just described, the cartridge itself is formed of plural layers or laminations and the finger electrodes 78, 80, 61 extend asymmetrically from the active central region around the corner of the spine to one side or the other. Since the electrodes are formed of steel or other strong metal sheet and have a much higher tensile strength and resistance to shear deformation than the surrounding adhesive or polymer layers, the large tangential stresses introduced by the processes of wrapping about the spine can displace the fingers, resulting in electrode misalignment.

In such displacement, or finger-pulling, the apertures 110 may be displaced from their position centrally over each RF drive line 70, may be displaced with respect to the overlying screen apertures 50, or both. Each form of misalignment may cause a drop-off in charged particle output from a hole 110 or 50. In practice, the total displacement due to shifting of the finger electrodes may be approximately fifty to one hundred fifty microns, comparable to the diameter of the apertures 110. This shift is of a small enough magnitude that it is possible to avoid any practical effects, with respect to the RF driver lines, by simply employing RF driver lines 70 of a greater width so that the aperture does not move off the edge of the drive line. For example, lines 70 may be made 0.5–0.8 mm wide without impairing their other critical design requirements (principally related to self capacitance, cross-talk, and breakdown isolation). At this width, there is ample leeway for the finger electrodes to shift without misaligning the relative positions of the lower two electrodes.

Figure 8:
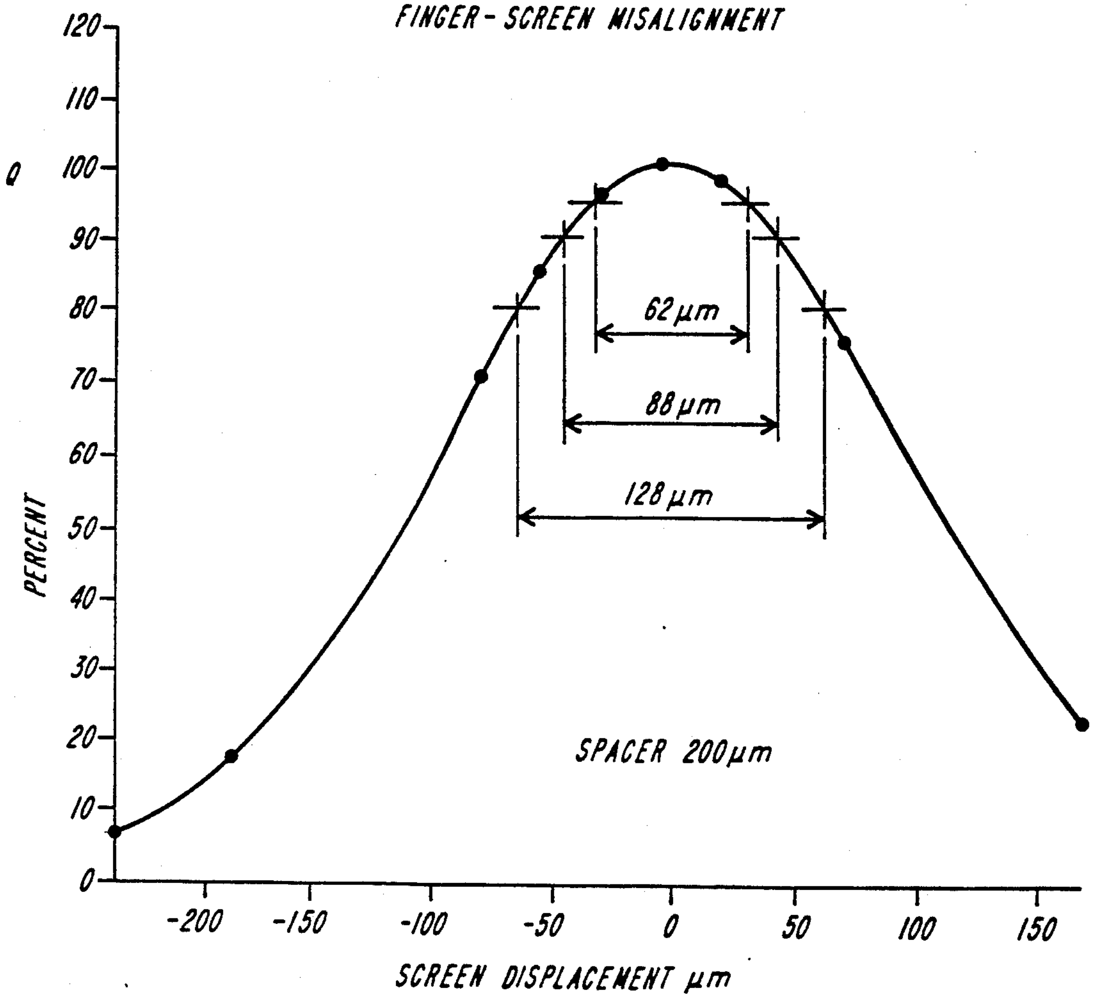
FIG. 8 shows the effect on charge deposition characteristics due to electrode shifting in prior art cartridge constructions.

The alignment between finger electrodes and the apertures of screen electrode 88 is another matter. FIG. 8 illustrates the relative amount of delivered charge as a function of the alignment of finger electrode apertures 110 with their corresponding screen electrodes apertures 50. The screen electrode is generally a single continuous sheet mounted over the active central region of the cartridge, as shown in FIG. 5. When the semi-fabricated electrode array is wrapped about its rigid spine, the leads 78 and pads 61 of the finger electrodes pull equally to the left and right, leaving the overlying screen substantially unmoved, while the underlying individual fingers are shifted alternately to the left and right. As shown in FIG. 8 variations of delivered charge in the range of fifteen to fifty percent may be expected for modest fifty to one hundred micron shifts of the finger transversely with respect to a screen electrode spaced two hundred microns above the finger.

Figure 6:
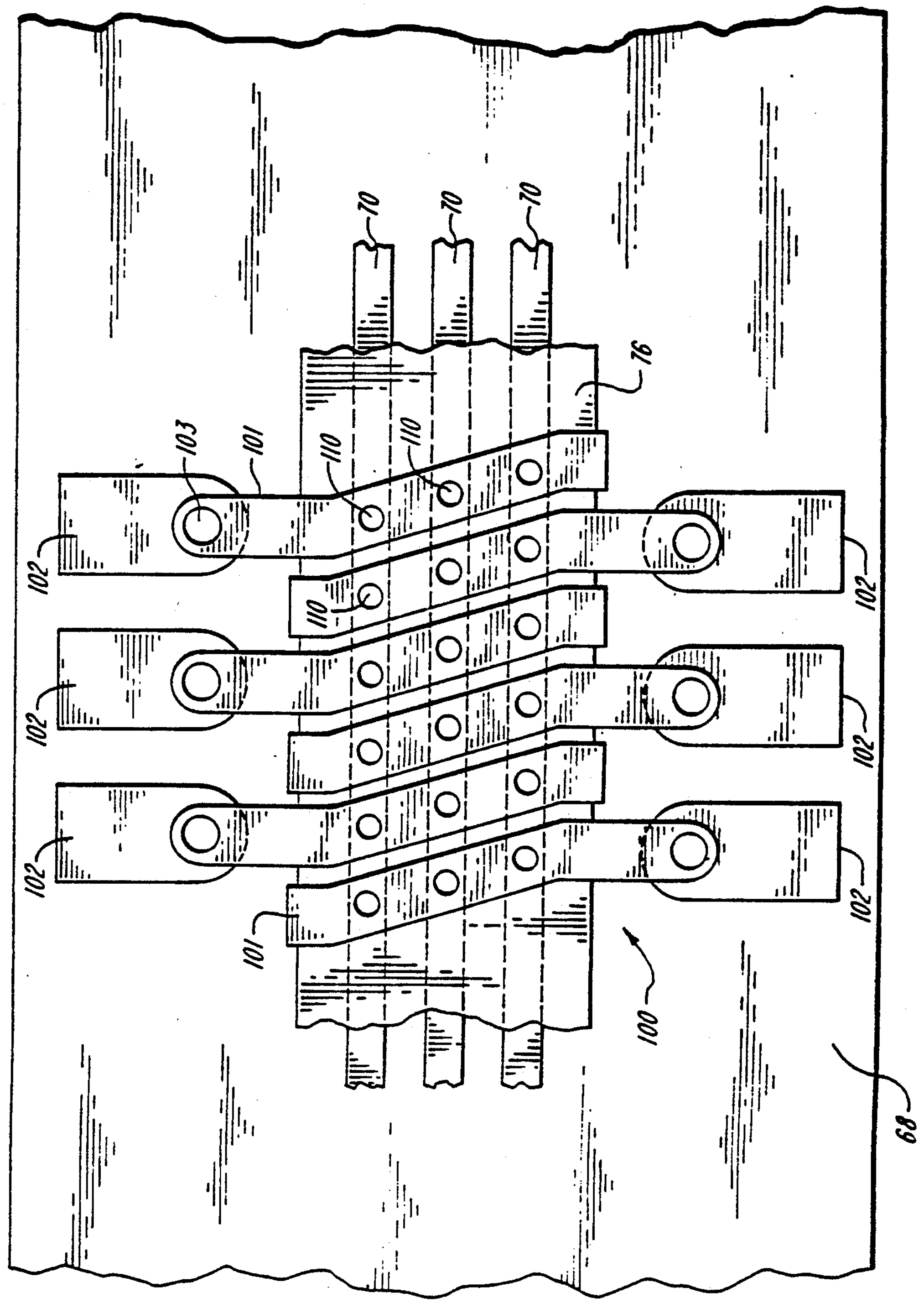
FIG. 6 illustrates electrodes of a cartridge in accordance with one embodiment of the present invention.
Figure 7:
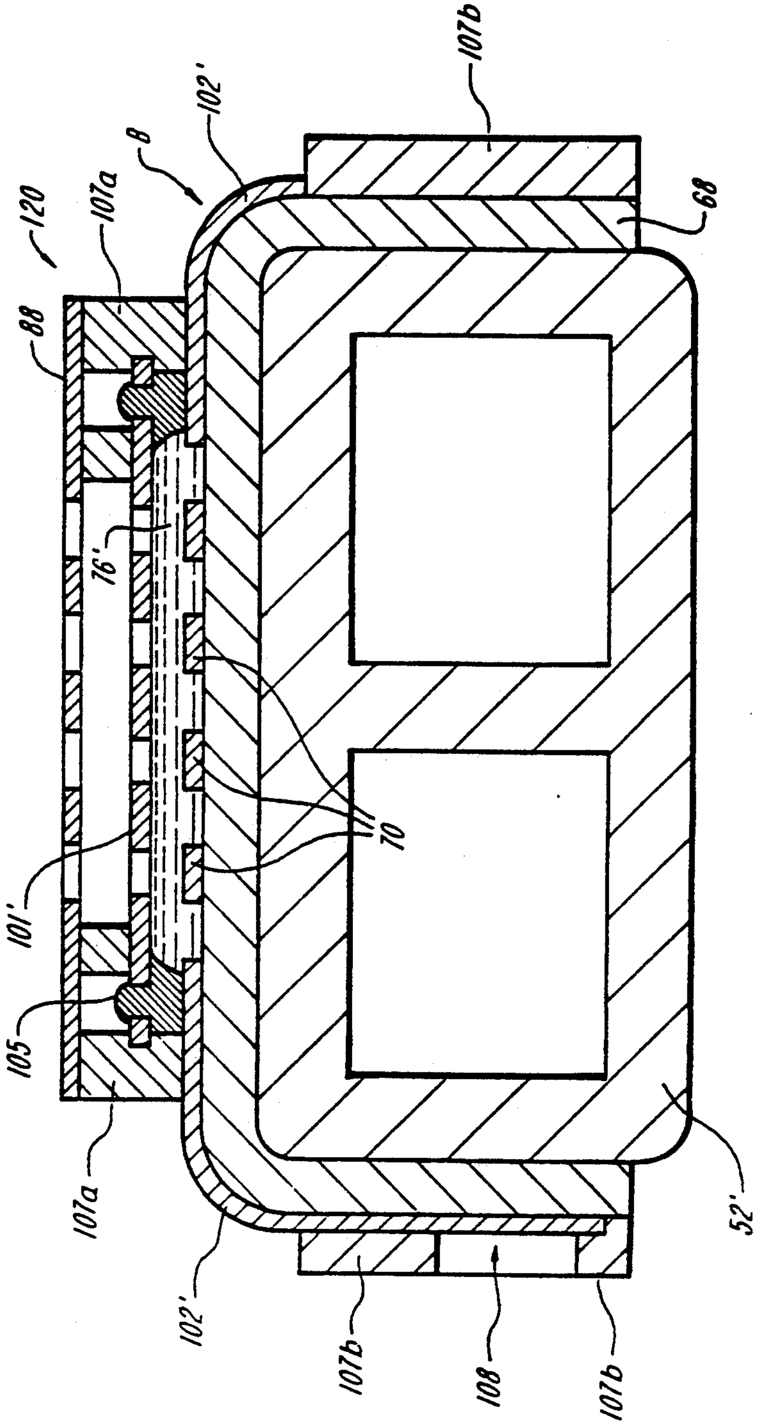
FIG. 7 is a schematic sectional view of another cartridge in accordance with the present invention.
Figure 7A:
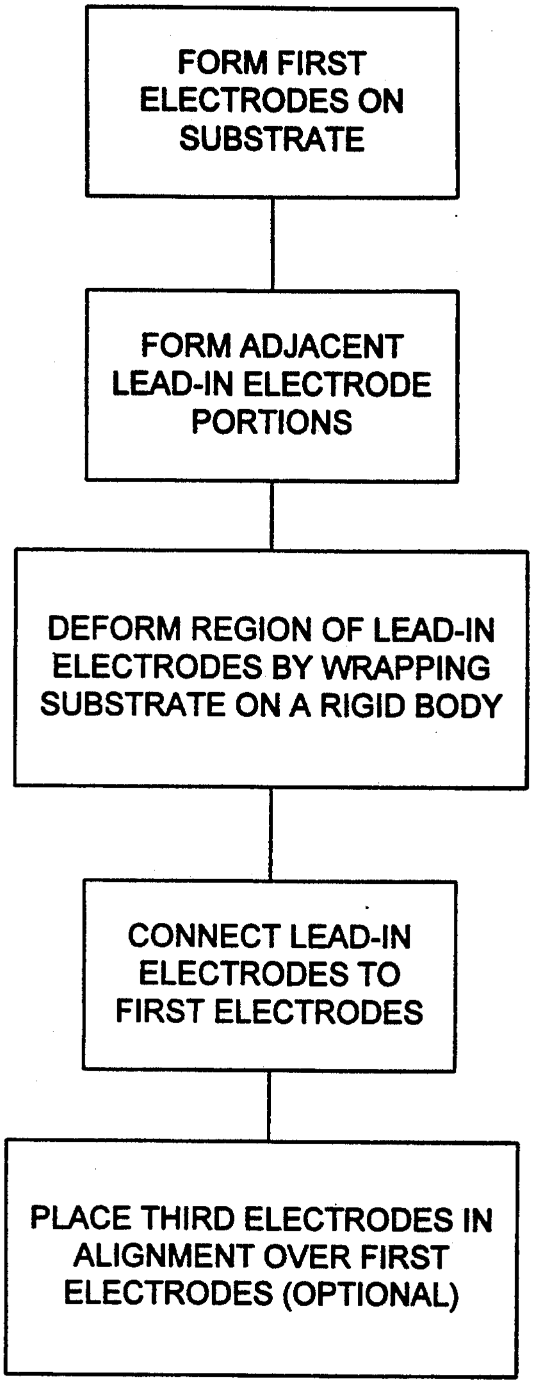
FIG. 7A illustrates steps of a manufacturing process for the cartridge of FIG. 7.

With the foregoing understanding of drawbacks in the prior art techniques for the fabrication of a print cartridge in mind, FIGS. 6 and 7 elucidate the novel features of the present invention. Briefly applicant's invention isolates the active region of the fingers from tangentially directed stresses introduced during manufacture. Components are further arranged so that manufacturing stress does not affect other structures in the central region.

FIG. 6 shows the electrode implementation of the present invention for a print cartridge of the type detailed above. A strong flexible substrate 68 has a plurality of parallel first electrodes, the RF driver lines 70, extending along the axis in a central region thereof, and a dielectric layer 76 uniformly covering the RF driver lines. These elements may be identical to the identically-numbered elements of the prior art cartridge of FIG. 5.

On top of dielectric layer 76, a plurality of finger electrodes 100 extend transversely to lines 70, with an opening 110 above each line 70. Each opening defines an edge structure that initiates glow discharge and defines the localized sites of charged particle generation. For simplicity, only three lines 70 are shown, and three openings 110 in each finger electrode. It will be understood that a much larger number of each is contemplated, however, as in conventional cartridges, with the number determined by the intended dot resolution to be achieved. Unlike the prior art, each finger electrode 100 includes at least two segments, illustrated by segments 101 and 102, each segment 101 being attached, both mechanically and electrically, to a segment 102 by a connecting element 103.

The print cartridge of the present invention preferably includes spacer layers and a screen electrode positioned over the finger electrodes to achieve well focused beams of charged particles described below.

FIG. 7 shows a transverse section of an assembled embodiment of a cartridge 120 of the present invention, to illustrate these further layers, the view being selected to clearly reveal details of its construction. As before, only a few (four) RF driver lines 70 are shown, the small number allowing a clearer description of details of construction. The RF drive lines 70 are formed on the flexible substrate 68 in the same manner as the prior art cartridge, by etching away unwanted regions of the copper cladding of the flexible substrate. However, at the same time lines 70 are formed, the inactive portions of the finger electrodes corresponding to segments (102 of FIG. 6) are formed extending outwardly to each side of the driver electrodes. As described above, this is done by suitable patterning of a resist before etching away portions of the copper cladding of a flexible glass reinforced epoxy sheet. The inactive portions of the finger electrodes include contact pads, and leads extending toward the central portion. A dielectric layer 76' formed of mica or suitable polymer is then laid down over the drive lines. Other materials that may be used for covering the active area of the RF electrodes are materials such as $Si_3N_4$, $SiO_2$, or $Al_2O_3$. These may be deposited by sputter deposition, for example. As in the embodiment of FIG. 6, the central portion 101' of the finger electrode containing apertures 110 is next attached. These may be deposited by methods familiar from thin film technology, or preferably are made as a separate sheet using techniques similar to those described above. Finger electrode active portion 101' is preferably made of stainless steel, Molybdenum, Tantalum, Tungsten or similar highly corrosion resistant and strong material, shaped by a process of wet or dry etching, milling, cutting or the like. When made as separate sheets, they are located and bonded in position using a pressure sensitive adhesive, as described above, and may, for example, first be installed as a single sheet with connecting regions between the electrodes to maintain alignment and allow easy handling, with a later etch to remove these regions and leave each finger electrode isolated from the others.

After the active hole-bearing portions 101' of the finger electrodes have been laid down, a sealing layer **107*a* is formed over the edges of the active finger electrodes, as well as over the non-active parts of the RF electrodes, using Vacrel as described above. This layer can also serve as a spacer layer for the space between the finger and the screen electrode, but does not extend laterally beyond that portion of the cartridge that is to form the flat active surface of the device. The finger pads and leads may also be sealed simultaneously, by Vacrel layer 107*b*, which, as shown, has contact openings 108 for contacting the electrode leads. Layers 107*a* and 107*b*, while they may be formed at the same time, are separated from each other laterally, so that layer 107*b* cannot exert stress on layer 107*a* after a bending or deformation of the flexible substrate. Specifically, the supporting structure 107*b* for the screen does not extend past the bend line B, and after exposure and development, is not connected to layer 107*a*** on the other side of the bend line B.

Up to this point, all fabrication has involved laying down insulators or spacers, and locating the finger electrode portions, on a planar sheet.

After the formation of the sealing and spacer layers, the substrate 68 is wrapped around the spine 52'. This step introduces mechanical deformation of the substrate with possible slippage of the overlying layers at corners or radii B. In the embodiment of FIG. 7, only the lead-in portion 102' of the finger electrodes pass through the critical region, and may therefore deform slightly. These leads 102' float freely with respect to the active portions 101' of the finger electrodes. Once the substrate has been wrapped and adhered to the spine 52', the active finger electrodes 101' are next interconnected to the lead in electrodes 102'. This is done using connectors 105 to conductively interconnect the two electrodes, suitable connection being provided, for example, by soldering, conductive glue, or other mechanical circuit connection.

The whole assembly is then thoroughly cleaned and the screen electrode 88 is next placed down and aligned over the apertures of the fingers, and attached and bonded as described above. This completes the assembly of the print cartridge.

In a cartridge made as described above, the finger electrode openings remain precisely aligned with the RF drive lines, and most or all tensile, stress is dissipated before the finger leads 102' are connected to the central aperture finger electrode portions 101'. In addition, the screen electrode is not located and bonded until after the wrapping, settling, and finger electrode connecting steps. As a result, the overlying electrode is stable, and long-term creep misalignment is substantially removed as a source of cartridge aging.

High resolution cartridges having high electrode packing densities may therefore be fabricated on rigid spines that provide a high degree of flatness. The spine allows electrode contact from outside circuitry to the finger electrodes by dependable spring-loaded contact buttons that direct considerable laterally-oriented force at contact openings 108 on either side of the cartridge without impairing the printer electrode gap spacing. Furthermore, relatively narrow print cartridges having corners or bends B very close to the active region may be fabricated without risk of delamination or misalignment, allowing these cartridges to fit narrower spaces, or fit compactly designed printers of special application, such as portable printers, ticket writing machines or the like.

The invention being thus described, various modifications, refinements and adaptations of the invention to the art will occur to those skilled in this technology, and such modifications, refinements and adaptations are understood to fall within the scope of the invention, as defined by the claims appended hereto.

What is claimed is:

1. A charge deposition device for forming a latent charge image on a member spaced proximate thereto, by selective actuation of electrodes of the device to release charge at discrete charging sites thereof, the device being deformed during manufacture, characterized in having plural electrodes arranged in layers that are aligned with each other to define charging sites, and having a set of electrodes in one layer extending at least partially through a deformed region of the device wherein the electrodes of the set each include a first electrode portion defining some of said charging sites, a separate second electrode portion extending at least partially through the deformed region, and conductive means interconnecting said first and second electride portions, said conductive means being attached thereto after deformation of the device such that strain of deformation does not misalign the first electrode portion.

2. A charge deposition device according to claim 1, wherein the conductive means includes a conductive glue.

3. A charge deposition device according to claim 1, wherein each first electrode portion is a control electrode having an opening defining a charging site.

4. A charge deposition device according to claim 1, wherein the plural electrodes arranged in layers are formed as a generally planar electrode set which is wrapped about a spine such that said discrete charging sites lie in a generally planar region, wherein each first electrode portion extends across a face of the spine in the planar region, and each said second electrode portion extends out of said plane to form electrode contacts away from the face.

5. A charge deposition device according to claim 1, wherein said plural electrodes are formed on a flexible substrate.

6. A method of manufacturing a charge deposition device having plural electrode lines, actuation of which generates streams of charged particles at electrode crossing positions, such method comprising the steps of:

forming electrodes defining an array of electrode crossing positions in a substantially flat region on a flexible substrate, forming lead-in electrode portions born by the substrate and separated from said electrodes, deforming at least a part of the substrate bearing said lead-in electrode portions, and subsequent to the step of deforming, connecting lead-in electrode portions to said electrodes.

7. A method of fabricating a multilayered electrode array device, such method comprising the steps of forming first and second electrode sets separated and adjacent each other on a substrate, wrapping the substrate on a rigid body, the step of wrapping including deforming a region of the substrate located away from said first electrode set, said region including at least a portion of electrodes of said second electrode set, and subsequently connecting electrodes of said first set to electrodes of said second set after stresses of deformation are dissipated so that the first set of electrodes does not creep.

8. The method of claim 7, further comprising the step of placing a third electrode over and in alignment with said first electrode set, after electrodes of said first set have been connected to electrodes of said second set.

9. A printer comprising a latent imaging member for receiving an electrostatic latent image, means for toning the latent image, means for transferring the toned image to a receiving sheet, and a charge deposition device having an array of selectively actuable electrodes for generating beams of charged particles to deposit a latent image on the latent imaging member, said array including first and second layers of electrodes, one layer comprising a set of electrodes each with a first portion lying in a generally planar region, and a second portion extending through a non-planar region away from said first portion, and an electrical connector interconnecting the first portion to the second portion so that the first portions each receive signals from a corresponding one of said second portions without introducing electrode shifting due to stresses introduced by said non-planar region.

* * * * *